(12) United States Patent
Rondot et al.

(10) Patent No.: US 9,684,285 B2
(45) Date of Patent: Jun. 20, 2017

(54) MECHATRONIC ASSEMBLY FOR DRIVING AN EXTERNAL MEMBER USING A BRUSHLESS MOTOR AND A SIMPLE ASSEMBLY OF ELECTRONIC COMPONENTS

(71) Applicant: MOVING MAGNET TECHNOLOGIES (MMT), Besançon (FR)

(72) Inventors: Eric Rondot, Berthelange (FR); Gaël Andrieux, Evilard (CH)

(73) Assignee: MOVING MAGNET TECHNOLOGIES (MMT), Besançon (FR)

( * ) Notice: Subject to any disclaimer, the term of this patent is extended or adjusted under 35 U.S.C. 154(b) by 63 days.

(21) Appl. No.: 14/651,027

(22) PCT Filed: Dec. 11, 2013

(86) PCT No.: PCT/FR2013/053027
§ 371 (c)(1),
(2) Date: Jun. 10, 2015

(87) PCT Pub. No.: WO2014/091152
PCT Pub. Date: Jun. 19, 2014

(65) Prior Publication Data
US 2015/0323908 A1    Nov. 12, 2015

(30) Foreign Application Priority Data

Dec. 13, 2012 (FR) ..................... 12 62015

(51) Int. Cl.
*F16K 31/06* (2006.01)
*G05B 1/03* (2006.01)
(Continued)

(52) U.S. Cl.
CPC .............. *G05B 1/03* (2013.01); *F16K 31/046* (2013.01); *G05B 1/02* (2013.01); *G05D 7/0623* (2013.01);
(Continued)

(58) Field of Classification Search
CPC ........... F16K 31/046; G05B 1/02; G05B 1/03; G05D 7/0623; G05D 7/0629; H02P 6/153; H02P 6/30; H02P 6/34
(Continued)

(56) References Cited

U.S. PATENT DOCUMENTS 4,365,187 A    12/1982   McDaniel et al.
5,519,294 A    5/1996   Chen et al.
(Continued)

FOREIGN PATENT DOCUMENTS

EP         0483894 A1    5/1992
WO    WO-02060711 A1    8/2002

*Primary Examiner* — Matthew W Jellett
(74) *Attorney, Agent, or Firm* — Harness, Dickey & Pierce, P.L.C.

(57) ABSTRACT

The present disclosure relates to a mechatronic assembly for positioning a member including a control unit and an actuator, the control unit including a control algorithm and a power bridge, the algorithm controlling the power bridge, the power bridge outputting a two-wire electric signal, the actuator including a polyphase brushless electric motor having N phases (N being or higher), binary probes for detecting the position of the rotor of the motor, and power switches suitable for supplying the N phases of the motor from the two-wire electric signal, and states of the power switches is controlled directly by a signal emitted by the detection probes.

20 Claims, 18 Drawing Sheets

(51) Int. Cl.
  *G05B 1/02* (2006.01)
  *F16K 31/04* (2006.01)
  *G05D 7/06* (2006.01)
  *H02P 6/34* (2016.01)
  *H02P 6/30* (2016.01)
  *H02P 6/15* (2016.01)

(52) U.S. Cl.
  CPC ........... *G05D 7/0629* (2013.01); *H02P 6/153* (2016.02); *H02P 6/30* (2016.02); *H02P 6/34* (2016.02)

(58) Field of Classification Search
  USPC .................................................... 251/129.11
  See application file for complete search history.

(56) References Cited

U.S. PATENT DOCUMENTS

| | | | |
|---|---|---|---|
| 5,773,941 A | 6/1998 | Moritz et al. | |
| 6,424,798 B1 | 7/2002 | Kitamine | |
| 6,828,702 B2* | 12/2004 | Beyer | H02K 21/042 290/35 |
| 7,028,545 B2 | 4/2006 | Gandel et al. | |
| 7,121,240 B2* | 10/2006 | Tani | F01L 1/022 123/321 |
| 7,304,450 B2 | 12/2007 | Prudham | |
| 7,589,445 B2 | 9/2009 | Gandel et al. | |
| 7,591,448 B2* | 9/2009 | Martin | F15B 13/0402 137/884 |
| 2004/0036295 A1 | 2/2004 | Nakagawa et al. | |
| 2006/0123903 A1 | 6/2006 | Gandel et al. | |
| 2008/0105230 A1 | 5/2008 | Kishibata et al. | |
| 2015/0123651 A1 | 5/2015 | Biwersi et al. | |

\* cited by examiner

| Ha | Hb | Hc | Q1 | Q2 | Q3 | Q4 | Q5 | Q6 | PhaseA | PhaseB | PhaseC |
|---|---|---|---|---|---|---|---|---|---|---|---|
| 1 | 0 | 1 | OFF | OFF | ON | ON | ON | OFF | OFF | OFF | ON |
| 1 | 0 | 0 | ON | OFF | OFF | OFF | ON | OFF | ON | OFF | OFF |
| 1 | 1 | 0 | ON | OFF | OFF | OFF | ON | ON | ON | OFF | OFF |
| 0 | 1 | 0 | OFF | ON | OFF | OFF | OFF | ON | OFF | ON | OFF |
| 0 | 1 | 1 | OFF | ON | OFF | ON | OFF | ON | OFF | ON | OFF |
| 0 | 0 | 1 | OFF | OFF | ON | ON | OFF | OFF | OFF | OFF | ON |

| Ha | Hb | Hc | Q1 | Q2 | Q3 | PhaseA | PhaseB | PhaseC |
|---|---|---|---|---|---|---|---|---|
| 1 | 0 | 1 | ON | OFF | ON | ON | OFF | ON |
| 1 | 0 | 0 | ON | OFF | OFF | ON | OFF | OFF |
| 1 | 1 | 0 | ON | ON | OFF | ON | ON | OFF |
| 0 | 1 | 0 | OFF | ON | OFF | OFF | ON | OFF |
| 0 | 1 | 1 | OFF | ON | ON | OFF | ON | ON |
| 0 | 0 | 1 | OFF | OFF | ON | OFF | OFF | ON |

| Ha | Hb | Q8 | Q9 | Q11 | Q10 | PhaseA | PhaseB |
|---|---|---|---|---|---|---|---|
| 0 | 0 | OFF | ON | OFF | ON | − | − |
| 1 | 0 | ON | OFF | OFF | ON | + | − |
| 1 | 1 | ON | OFF | ON | OFF | + | + |
| 0 | 1 | OFF | ON | ON | OFF | − | + |

| Direction | Ha | Hb | Hc | Gate Q1 | Gate Q2 | Gate Q3 |
|---|---|---|---|---|---|---|
| 0 | 1 | 0 | 1 | ON | OFF | ON |
| 0 | 1 | 0 | 0 | ON | OFF | OFF |
| 0 | 1 | 1 | 0 | ON | ON | OFF |
| 0 | 0 | 1 | 0 | OFF | ON | OFF |
| 0 | 0 | 1 | 1 | OFF | ON | ON |
| 0 | 0 | 0 | 1 | OFF | OFF | ON |
| 1 | 1 | 0 | 1 | OFF | ON | OFF |
| 1 | 1 | 0 | 0 | OFF | ON | ON |
| 1 | 1 | 1 | 0 | OFF | OFF | ON |
| 1 | 0 | 1 | 0 | ON | OFF | ON |
| 1 | 0 | 1 | 1 | ON | OFF | OFF |
| 1 | 0 | 0 | 1 | ON | ON | OFF |

| Direction | Ha | Hb | Hc | Q1 | Q1' | Q2 | Q2' | Q3 | Q3' | Phase A | Phase B | Phase C |
|---|---|---|---|---|---|---|---|---|---|---|---|---|
| 0 | 1 | 0 | 1 | OFF | ON | ON | OFF | OFF | OFF | PWR+ | 0V | – |
| 0 | 1 | 0 | 0 | OFF | ON | OFF | OFF | ON | OFF | PWR+ | – | 0V |
| 0 | 1 | 1 | 0 | OFF | OFF | OFF | ON | ON | OFF | – | PWR+ | 0V |
| 0 | 0 | 1 | 0 | ON | OFF | OFF | ON | OFF | OFF | 0V | PWR+ | – |
| 0 | 0 | 1 | 1 | ON | OFF | OFF | OFF | OFF | ON | 0V | – | PWR+ |
| 0 | 0 | 0 | 1 | OFF | OFF | ON | OFF | OFF | ON | – | 0V | PWR+ |
| 1 | 1 | 0 | 1 | ON | OFF | OFF | ON | OFF | OFF | 0V | PWR+ | – |
| 1 | 1 | 0 | 0 | ON | OFF | OFF | OFF | OFF | ON | 0V | – | PWR+ |
| 1 | 1 | 1 | 0 | OFF | OFF | ON | OFF | OFF | ON | – | 0V | PWR+ |
| 1 | 0 | 1 | 0 | OFF | ON | ON | OFF | OFF | OFF | PWR+ | 0V | – |
| 1 | 0 | 1 | 1 | OFF | ON | OFF | OFF | ON | OFF | PWR+ | – | 0V |
| 1 | 0 | 0 | 1 | OFF | OFF | OFF | ON | ON | OFF | – | PWR+ | 0V |

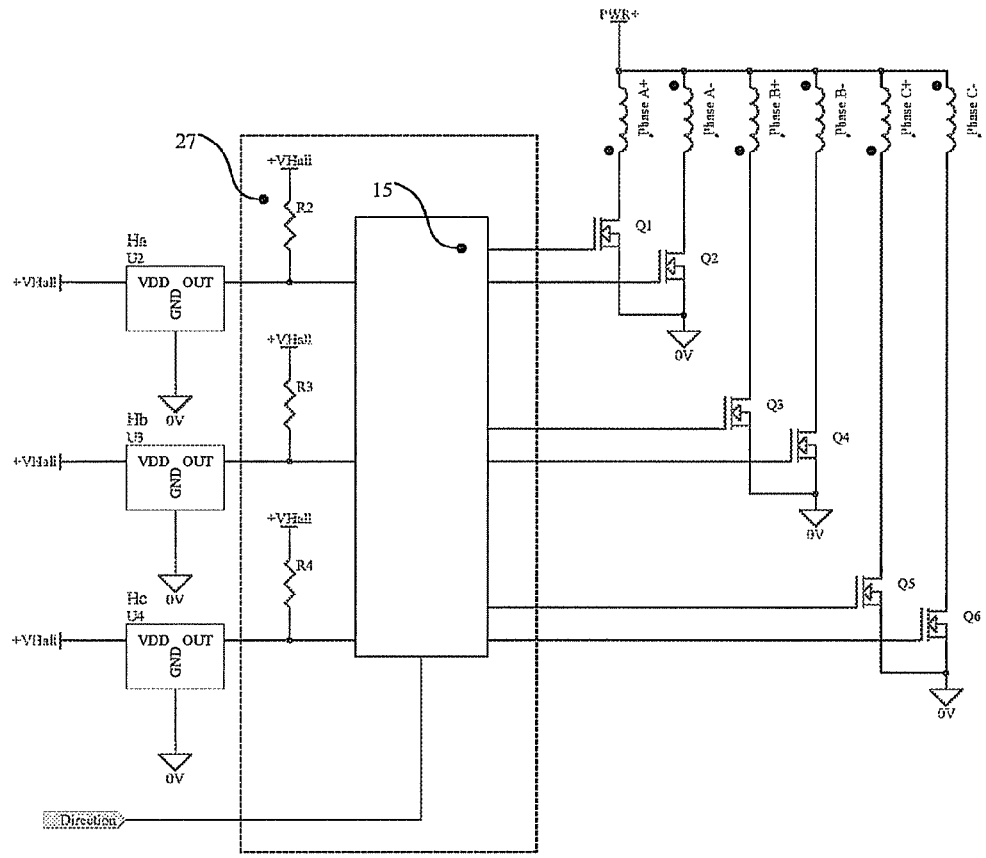

| Direction | Ha | Hb | Hc | Q1 | Q2 | Q3 | Q4 | Q5 | Q6 | Phase A | Phase B | Phase C |
|---|---|---|---|---|---|---|---|---|---|---|---|---|
| 0 | 1 | 0 | 1 | ON | OFF | OFF | ON | OFF | OFF | + | − | Z |
| 0 | 1 | 0 | 0 | ON | OFF | OFF | OFF | OFF | ON | + | Z | − |
| 0 | 1 | 1 | 0 | OFF | OFF | ON | OFF | OFF | ON | Z | + | − |
| 0 | 0 | 1 | 0 | OFF | ON | ON | OFF | OFF | OFF | − | + | Z |
| 0 | 0 | 1 | 1 | OFF | ON | OFF | OFF | ON | OFF | − | Z | + |
| 0 | 0 | 0 | 1 | OFF | OFF | OFF | ON | ON | OFF | Z | − | + |
| 1 | 1 | 0 | 1 | OFF | ON | ON | OFF | OFF | OFF | − | + | Z |
| 1 | 1 | 0 | 0 | OFF | ON | OFF | OFF | ON | OFF | − | Z | + |
| 1 | 1 | 1 | 0 | OFF | OFF | OFF | ON | ON | OFF | Z | − | + |
| 1 | 0 | 1 | 0 | ON | OFF | OFF | ON | OFF | OFF | + | − | Z |
| 1 | 0 | 1 | 1 | ON | OFF | OFF | OFF | OFF | ON | + | Z | − |
| 1 | 0 | 0 | 1 | OFF | OFF | ON | OFF | OFF | ON | Z | + | − |

(+: current in phase+ / − : current in phase − / Z no current in any phase.

Fig. 18

MECHATRONIC ASSEMBLY FOR DRIVING AN EXTERNAL MEMBER USING A BRUSHLESS MOTOR AND A SIMPLE ASSEMBLY OF ELECTRONIC COMPONENTS

CROSS-REFERENCE TO RELATED APPLICATIONS

This application is a National Phase Entry of International Application No. PCT/FR2013/053027, filed on Dec. 11, 2013, which claims priority to French Patent Application Serial No. 1262015, filed on Dec. 13, 2012, both of which are incorporated herein by reference.

TECHNICAL FIELD

The present invention relates to the field of polyphase brushless direct current (BLDC) motors. More particularly, it relates to a method of controlling such motors, not using a microprocessor and requiring only two electrical wires for powering the motor.

The need for mechatronic actuators is making itself felt increasingly strongly in a multitude of sectors of activity, also having environments that are increasingly severe. The automobile sector is one such sector, and the needs of original equipment manufacturers (OEMs) for reducing pollutant emissions are leading them to propose a multitude of add-ons to their internal combustion engines. In addition, the downsizing of the engines and the profusion of peripheral functions are making the available spaces increasingly small. The environments in which the peripheral functions need to be installed have thermal and mechanical constraints that are very severe (temperature, vibration, and available space).

It is thus becoming fundamental to propose systems that are increasingly robust in coping with those constraints. Brushless direct current (BLDC) motor technology meets those constraints but is often penalized by a need for control electronics. The electronics rapidly becomes a sticking point for guaranteeing a lifespan for the high-temperature system. Optimized and innovative solutions thus need to be developed.

In addition, the automobile sector is increasingly competitive and many mechatronic functions have come to be implemented by using the technology of brushed DC motors associated with gearing. This is because, for reasons of system costs, the brush(ed) DC motor (BDC) is often preferred to the brushless DC motor (BLDG), in particular and mainly for reasons of ease of control, but also for reasons of electronic costs that are reduced due to the absence of a microprocessor. This is reinforced by the fact that many electronic control units (ECUs) for vehicles are equipped with power bridges (referred to as "H-bridges") dedicated to two-directional control of single-phase actuators (DC motor or solenoid that is polarized or otherwise).

However, engineers can regret that, for purely economic reasons, they cannot use technology offering unparalleled advantages compared with a conventional DC motor, namely the BLDC, which offers robustness, low wear, electromagnetic compatibility, compactness, etc. Using an existing ECU also makes it possible to accelerate putting a product on the market, by avoiding the need to debug and to validate new control and regulation software.

BACKGROUND

A good number of functions or features, be it in the automobile sector or in other fields, require systems making it possible to have positioning that is servo-controlled in rotation or in translation, it being possible for such systems to be of the pneumatic, hydraulic, or electric types. In the context of the present invention, consideration is given to electric actuators only. In this invention, the term "actuator" describes the assembly formed by an electric motor, by any detection means for detecting the position of the motor rotor, by any movement transformation means, by an outlet position sensor, by the commutation electronics, and by the connector.

Two main families of actuators can be identified:

"dumb" actuators; FIG. 1 shows such an actuator (2), which includes a brushed DC motor (20) and a position sensor (7) that can be summarized as being a resistive track associated with a slider; the smart portion in charge of position servo-control is in a separate, offset electronic unit (1), known as the electronic control unit or "ECU" by persons skilled in the art; and "smart" actuators; such an actuator includes a microcontroller in charge of the position servo-control function; generally, this type of actuator is controlled either by a pulse-width modulation (PWM) signal or by a local interconnect network (LIN) or controller area network (CAN) communication bus, those types of bus being recognized as standard buses in the automobile industry.

For automatable applications close to the internal combustion engine, such as, for example, wastegates of a turbo system, the "dumb" solution is much preferred to the "smart" solution for reasons of high-temperature compatibility of the electronic components, in particular of the microcontroller. In a dumb solution, as shown diagrammatically in FIG. 1, an ECU (1) reads the position signal delivered by a position sensor (7) coupled to the mechanical outlet (12) of the actuator (2), and then computes a torque and direction signal (6) applied to a brushed DC motor (20). The mechanical outlet (12) is coupled to an external member (not shown) to be moved, such as a valve member or a needle, for example. The action on the motor (20) is transmitted to the mechanical outlet (12) of the actuator (2) via a gearing stage or (rotary-to-linear) movement transformer (9). Thus, this closed loop makes it possible to servo-control the mechanical outlet (12) of the actuator (2) in terms of position. There are few connections (3) between the ECU (1) and the actuator (2): 2 wires for the brushed DC motor (20)—for which the differential signal between the two wires can be a positive signal or a negative signal—and 3 wires for the position sensor (7)—including one for ground, one for a positive signal for the power supply, and one for the position signal. The DC motor (20) responds to the torque and direction signals (6) delivered by the ECU (1) through a power bridge referred to as an "H-bridge" (see FIG. 24) constituted by four transistors (15a, 15b, 15c, 15d).

U.S. Pat. No. 5,773,941 describes an invention making it possible to control, in one direction, a three-phase brushless DC motor using two wires, one of which is a reference (ground or OV) wire and the other which is a torque signal wire. An external power supply delivers the torque signal that can be a continuous signal or a chopped signal. The commutation electronics 20 is self-powered by a rechargeable power supply taking its energy from the torque signal.

Regardless of the industrial or automobile applications, the brushless DC motor is currently in widespread and preferred use because of the advantages it offers compared with the conventional DC motor as described in U.S. Pat. No. 4,365,187 (column 1, line 9). The preferred type of brushless motor is the one having a single-phase brushless DC motor structure with one coil or two half-coils. Simple electronics that can be integrated in the vicinity of the motor, or indeed in the housing 30 of the motor, manages the self-commutation of said motor on the basis of the signal delivered by one or two Hall-effect probes.

The increasing electrification of the functions present under the hood or bonnet of an automobile is resulting in the electrical actuators having to cope with various constraints and stresses that are increasingly severe, in particular as regards withstanding ambient temperatures greater than 125° C. Existing "smart" systems, incorporating a microcontroller and/or complex electronics necessary for controlling a motor and for servo-controlling the position of the actuator, are limited in terms of the ambient temperatures they can withstand. The type of component that is economically "viable" does not make it possible to go beyond the limit of 125° C., and often requires costly cooling means.

The existing "dumb" systems are compatible with the desired ambient temperatures because the actuator does not include any complex and sensitive electronic component. However, such an actuator uses a brushed DC motor that, industrially speaking, offers lower performance and is less compact than a brushless DC motor, which also offers the huge advantage of having a lifespan that is much longer than the lifespan of a conventional brushed DC motor. It is accepted by persons skilled in the art that brushed DC motors are sources of electromagnetic disturbance, which is a sensitive point in an environment that is increasingly occupied by electronic systems and computers.

One of the conventional structures for polyphase brushless DC motors is a motor having three phases connected either in a star configuration or in a delta configuration, thereby leaving three connection points for the power supply of the motor. The self-commutation of a brushless DC motor for a positioning application requires three probes to be used to determine the position of the motor rotor. Designing a "dumb" actuator with a brushless DC motor, instead of a brushed DC motor, requires use to be made of an ECU that is adapted and designed for controlling a three-phase motor, namely a three-phase bridge with six transistors and five connection points with rotor probes. Position servo-control systems require both-way control of the rotation of the motor, which cannot be achieved by the invention described in U.S. Pat. No. 5,773,941, in which the inlet (referenced 22 in that text) accepts only one polarity only.

The other applications of brushless DC motors, the majority of which are single-phase, such as those described in U.S. Pat. No. 4,365,187 are mainly used for fans or pumps requiring only one rotation direction. As described in column 5, line 3 of the above-mentioned patent, the structure of the motor, by its geometrical shape or by the positioning of the probes, should be designed to ensure that the motor starts properly and in the preferred direction of rotation. As a result, the single-phase brushless DC motor and its control electronics are not suitable for positioning applications, which are the subject of the present invention, unceasingly requiring position correction that needs the motor to be rotated in both directions.

SUMMARY

The present invention relates to a control system powered by an energy source and to an actuator that can be of the linear or rotary type depending on the movement transformation system applied to the mechanical outlet. An absolute sensor measures the angular or linear position at the mechanical outlet of the actuator, which position is servo-controlled by the control system.

An object of the invention is to propose an actuator driven by a brushless DC motor while also preserving the existing elements identical to the system based on a brushed DC motor. The actuator is connected to the control system via a connector grouping together the analog and/or digital signals coming from the position sensor, and the signals combining the direction and the torque to be produced by the BLDC motor.

A rudimentary electronic circuit that withstands high temperatures (>125° C.) manages the self-commutation of the N phases of the motor by means of N probes indicating the position of the rotor of the motor. An object of the solution described below is to propose a technological compromise or trade-off making it possible to solve the above-mentioned problems by proposing an economical solution that does not require any microprocessor, enabling a brushless DC motor to be used in place of a brushed DC motor, while also keeping the possibilities of using a reversible polyphase motor and of controlling it in both rotation directions. The invention thus applies to any polyphase motor having N phases.

The present invention offers an economical solution for using a brushless DC motor instead of a brushed DC motor, while satisfying the following criteria:

1—Keeps an existing, offset, separate control (ECU), without any hardware or software alteration whatsoever.

2—Is immediately interchangeable with existing products.

3—Increases the lifespan of the actuator.

4—Makes it possible for the motor to be controlled in both directions.

5—Requires very few electronic components (that are simple and robust) to be incorporated into the actuator.

6—The components used offer compatibility with and resistance to ambient temperatures of >125° C.

7—The brushless DC motor and the low number of components make highly compact integration possible.

8—Makes it possible to achieve savings in the weight of the actuator.

9—Reduces electromagnetic disturbance.

More particularly, the invention provides a mechatronic assembly for positioning a member, the mechatronic assembly comprising a control unit (1) and an actuator (2), the control unit (1) comprising a servo-control algorithm and a power bridge, said algorithm controlling said power bridge, the power bridge delivering a two-wire electrical signal (6) made up of a torque signal and of a direction signal, the actuator (2) comprising a polyphase brushless electric motor (8) having N phases, binary detection probes (11) for detecting the position of the rotor of said motor (8), and power switches (25) suitable for powering the N phases of the motor (8) from the two-wire electrical signal (6), said mechatronic assembly being characterized in that the states of the power switches (25) are controlled directly by a signal coming from the detection probes (11).

In the sense of the present patent, "controlled directly" means the situation in which the signal controlling the states of the power switches comes, without any other processing:

1—either from the outlet of a detection probe;

2—or from the logical combination of a plurality of detection probes;

3—or else from the combination of one or more detection probes and of a direction signal (direction of rotation of the motor, as described above). No processing other than very simple logic operations is applied between the signal coming from the detection probes and the control of the states of the power switches. These simple operations remain achievable with logic gates or with discrete components such as transistors, diodes, resistors, etc.

In a preferred embodiment, the direction of rotation of the motor is imposed by an elementary combinatory logic built on the basis of the polarity of the two-wire electrical signal and of the signal from the detection probes. In a particular embodiment, the mechatronic assembly further comprises a servo-control sensor for absolute servo-control of the member, which sensor is powered by a second electrical signal. In another embodiment, the servo-control sensor for absolute servo-control of the member is powered by the two-wire electrical signal.

In a particular embodiment, the binary detection probes for detecting the position of the rotor are powered by the two-wire electrical signal. In a particular embodiment, the binary detection probes for detecting the position of the rotor are powered by the second electrical signal. In a particular embodiment, the two-wire electrical signal is a continuous signal of amplitude controlled by the servo-control algorithm on the basis of the position information given by the servo-control sensor.

In another particular embodiment, the two-wire electrical signal is a chopped signal of mark-to-space ratio or duty cycle controlled by the servo-control algorithm on the basis of the position information given by the servo-control sensor. In a preferred embodiment, the two-wire signal is rectified by a diode bridge in order to feed positive current to the N phases of the motor.

The invention also provides a fluid flow control valve, characterized in that it includes a valve member driven by the actuator of a mechatronic assembly equipped with a control unit (1) comprising a servo-control algorithm and a power bridge, said algorithm controlling said power bridge, the power bridge delivering a two-wire electrical signal (6) made up of a torque signal and of a direction signal, the actuator (2) comprising a polyphase brushless electric motor (8) having N phases, binary detection probes (11) for detecting the position of the rotor of said motor (8), and power switches (25) suitable for powering the N phases of the motor (8) from the two-wire electrical signal (6), said mechatronic assembly being characterized in that the states of the power switches (25) are controlled directly by a signal coming from the detection probes (11).

The invention further provides a servo-control circuit for servo-controlling the actuator of a moving member mounted on an internal combustion engine, said servo-control circuit being characterized in that it includes a computer executing a servo-control algorithm and a power bridge, said algorithm controlling said power bridge, the power bridge delivering a two-wire electrical signal (5) made up of a torque signal and of a direction signal, the actuator (2) comprising a polyphase brushless electric motor (8) having N phases, binary detection probes (11) for detecting the position of the rotor of said motor (8), and power switches (25) suitable for powering the N phases of the motor (8) from the two-wire electrical signal (6), said mechatronic assembly being characterized in that the states of the power switches (25) are controlled directly by a signal coming from the detection probes (11).

BRIEF DESCRIPTION OF THE DRAWINGS

Other characteristics and advantages of the invention appear fully from the following description of it that is given below by way of non-limiting indication, with reference to the accompanying drawings, in which:

FIG. 18 shows a portion of the electronic circuit of the commutation logic in a particular embodiment enabling the motor to be controlled in both directions and in two-pole manner (magnetically), and its truth table;

DETAILED DESCRIPTION

Figure 1:
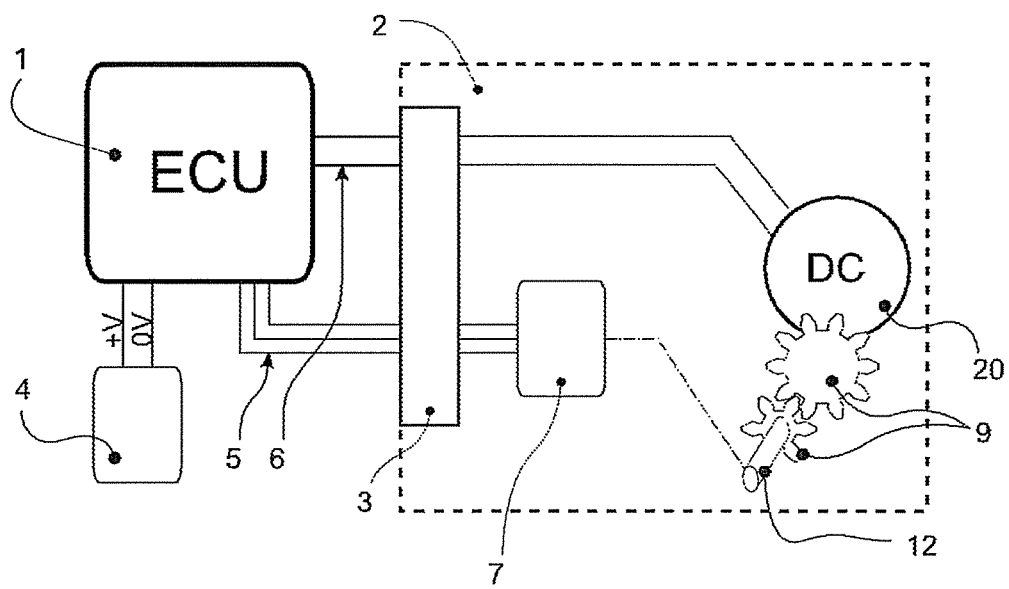
FIG. 1 shows a prior art mechatronic assembly.

FIG. 1 shows a state-of-the-art mechatronic positioning assembly that is in common use in existing systems, that assembly being made up of an energy source (4) powering a control unit (1) controlling an actuator (2) made up of a brushed DC motor (20) associated with a mechanical movement transformation assembly (9). A sensor (7), coupled to the mechanical outlet (12) of the actuator, feeds back the position information (5) to the control system (1), which acts on the combined torque and direction signals (6) grouped together in a link connector (3). The mechanical outlet (12) is coupled to an external member to be moved, such as a valve member or a needle, for example and in an automobile application.

Figure 2:
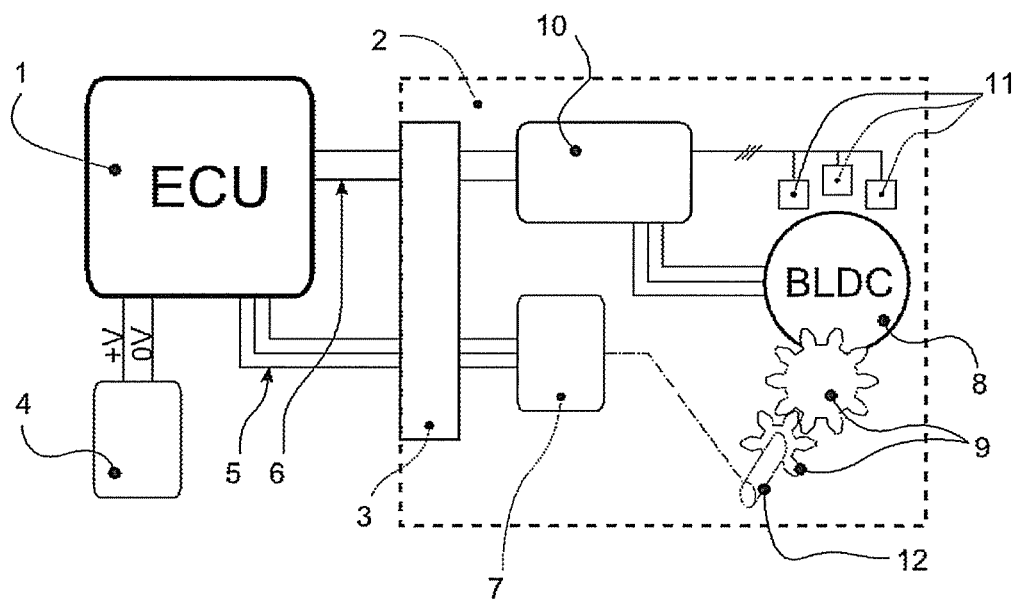
FIG. 2 shows a mechatronic assembly of the invention.

FIG. 2 shows a mechatronic positioning assembly of the invention, made up of an energy source (4) powering a control unit (1) controlling an actuator (2) made up of a brushless DC motor (8) associated with a mechanical movement transformation assembly (9). A sensor (7), coupled to the mechanical outlet (12) of the actuator (2), feeds back the position information (5) to the control system (1), which acts on the combined torque and direction signals (6) grouped together in a link connector (3). The position of the rotor of the motor (8) is read by means of N probes (11) that, via a rudimentary electronic circuit (10) self-commute the N phases of the motor (8).

Figure 3:
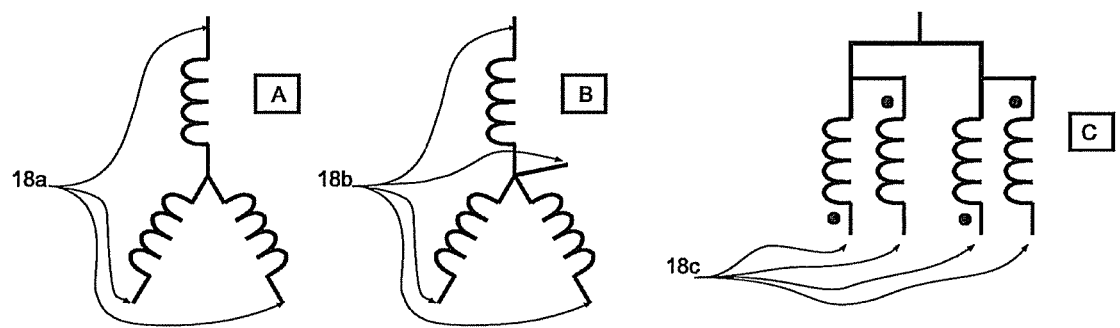
FIG. 3 shows an example of the various multi-phase coils of motors to which the invention relates.

A positioning system (FIG. 2), be it rotary or linear, is made up of a separate electronic control unit (1) or "ECU", and of an actuator (2) incorporating a rudimentary circuit that uses the signals coming from the probes (11) indicating the position of the rotor of a brushless DC motor (8) so as to self-commute said motor. The present invention applies to any type of polyphase brushless DC motor as shown in a few examples of three-phase topology (A and B) and of two-phase topology (C) presented in FIG. 3. In order to make them easier to read, the descriptions given below are based only on a sub-set of N in the range 2 to 3, where N is the number of phases of the brushless DC motor. The position of the mechanical outlet (12) of the actuator (2) is read by the ECU (1) by means of the position signals (5) delivered by the sensor (7) coupled to the mechanical outlet (12). The ECU (1), powered by the battery of the vehicle (4), executes a position servo-control algorithm and generates the torque and direction signals (6) for the motor that then acts on the mechanical outlet (12) of the actuator via a gearing or movement transformation mechanism (9). The self-commutation electronic circuit (10) is designed in such a manner that the actuator (2), regardless of whether it is driven by a brushless DC motor (FIG. 2) or by a brushed DC motor (FIG. 1) offers compatibility both in the functions and in the connections (3).

Figure 8:
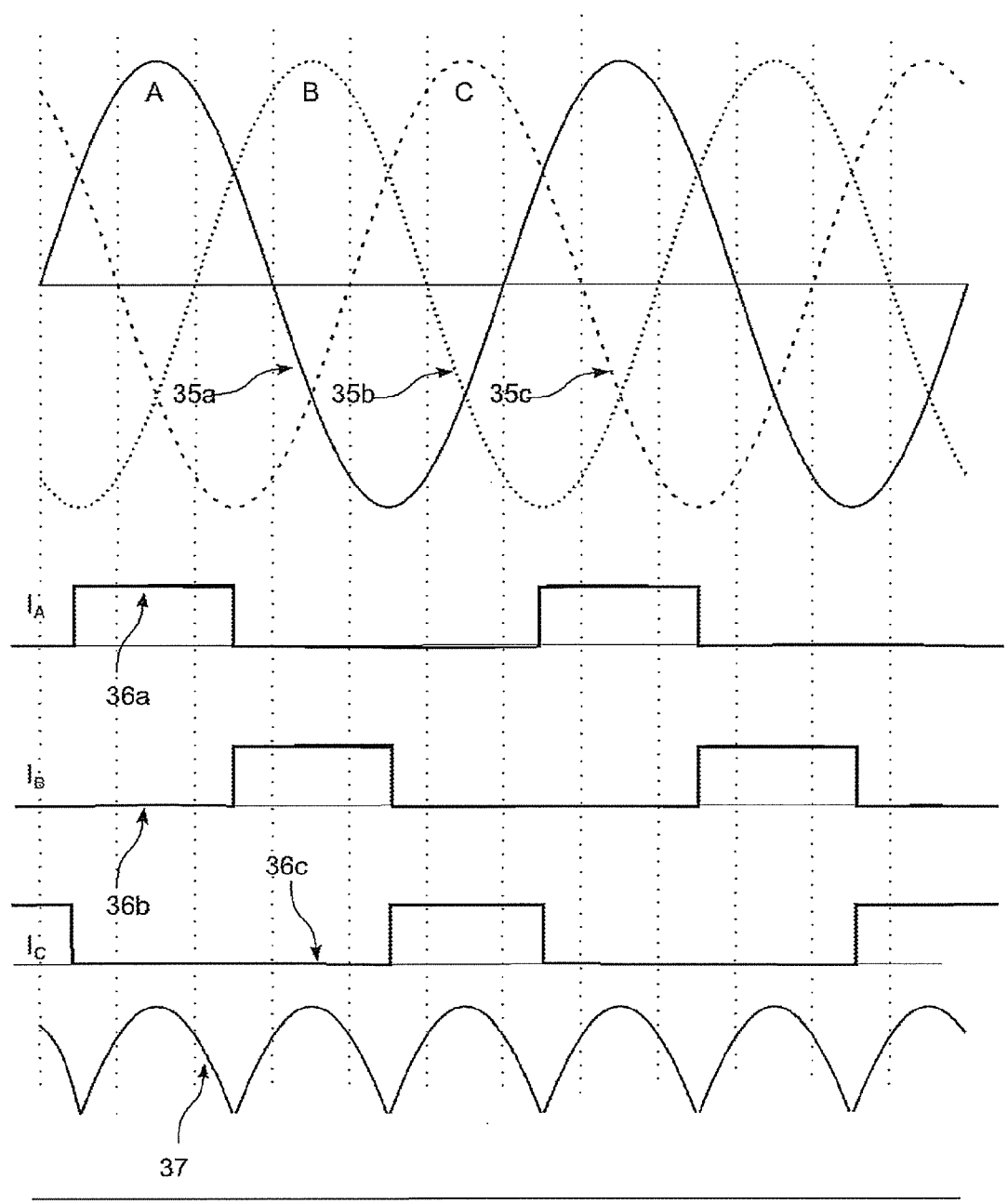
FIG. 8 shows the waveforms of the torque and of the currents in a first operating mode referred to as "120° single-pole"
Figure 12:
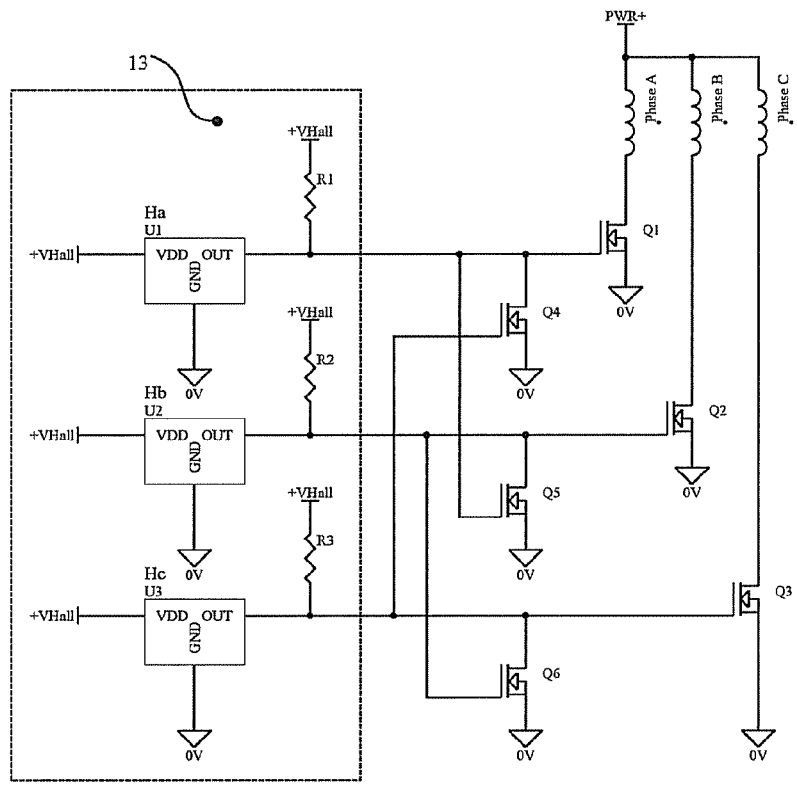
FIG. 12 shows the electronic circuit of the commutation logic in the "120° single-pole" first mode, and its truth table.
Figure 13:
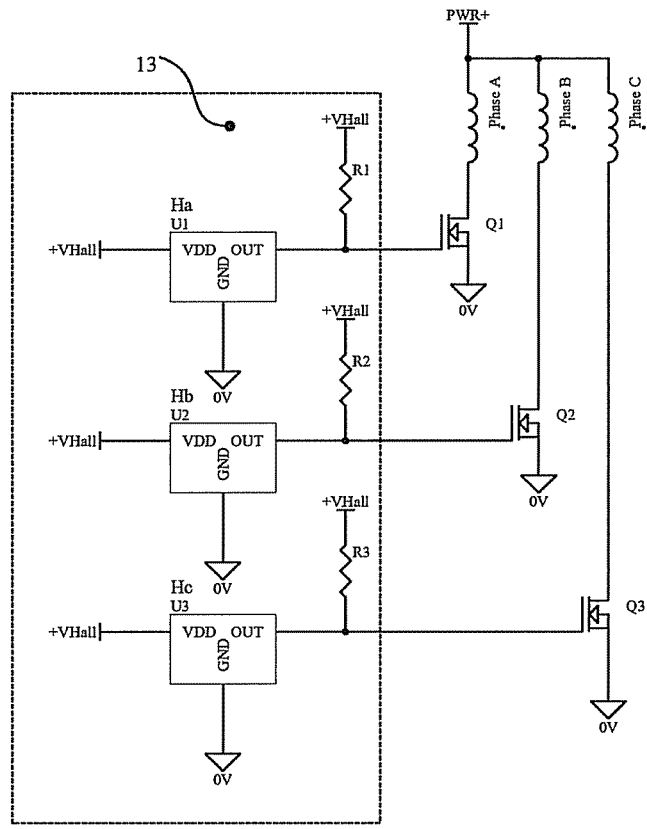
FIG. 13 shows the electronic circuit of the commutation logic in the "180° single-pole" second mode, and its truth table.

For economic reasons, the brushless DC motor (8) is controlled in single-pole manner, requiring only three transistors. That also simplifies the self-commutation circuit. The system, designed to achieve positioning, preferably operates in 180° mode (FIG. 9), offering six motor steps per electrical period, compared with three steps in 120° mode (FIG. 8). The number of steps per electrical period for each of these operating modes can be deduced from the waveform of the torque signal (39 in FIGS. 9 and 37 in FIG. 8). The minimum electronic diagram enabling the brushless DC motor to be self-commuted is shown in FIG. 12 and FIG. 13 respectively for the 120° mode and for the 180° mode.

Figure 9:
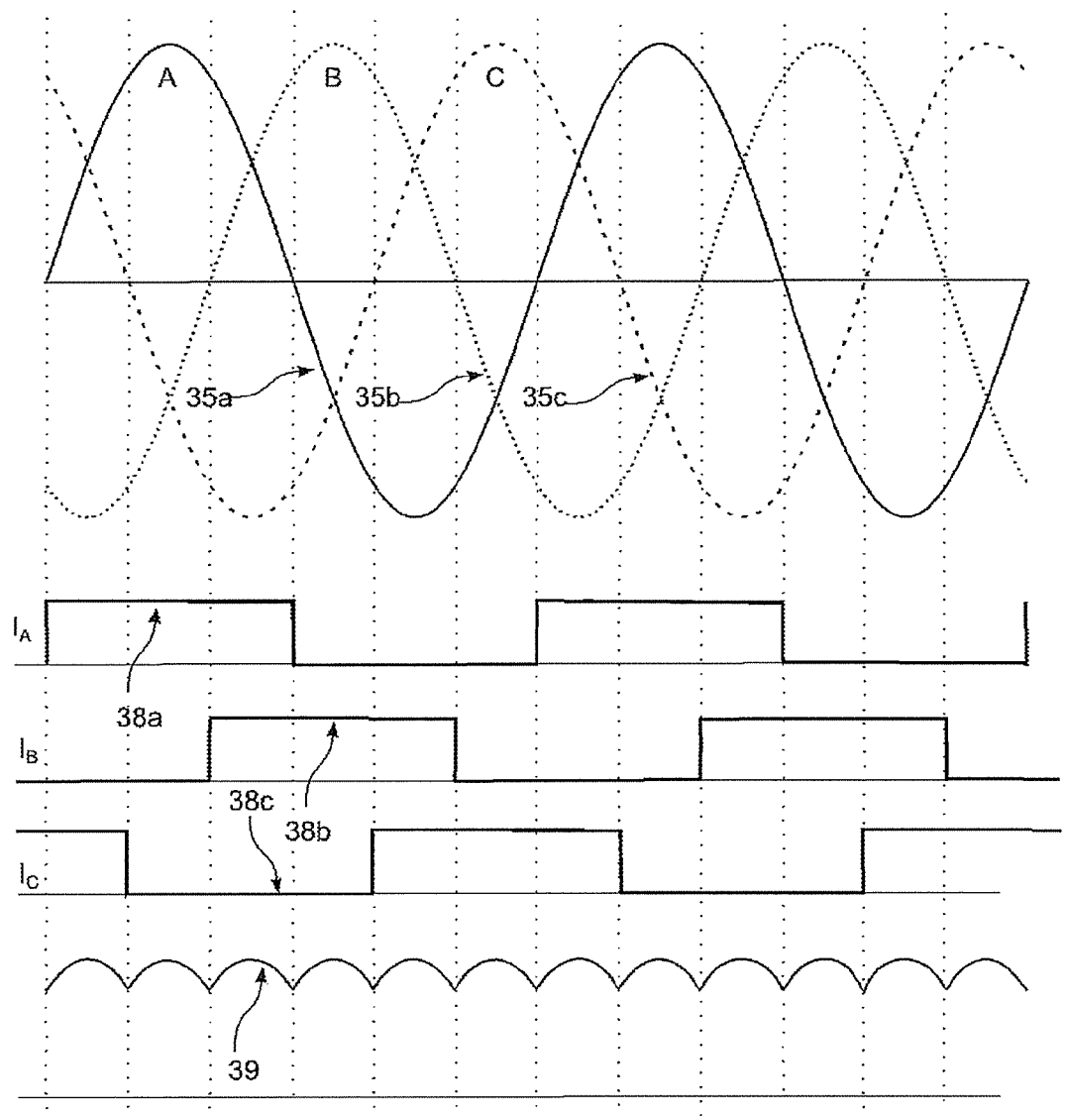
FIG. 9 shows the waveforms of the torque and of the currents in a second operating mode referred to as "180° single-pole"
Figure 10:
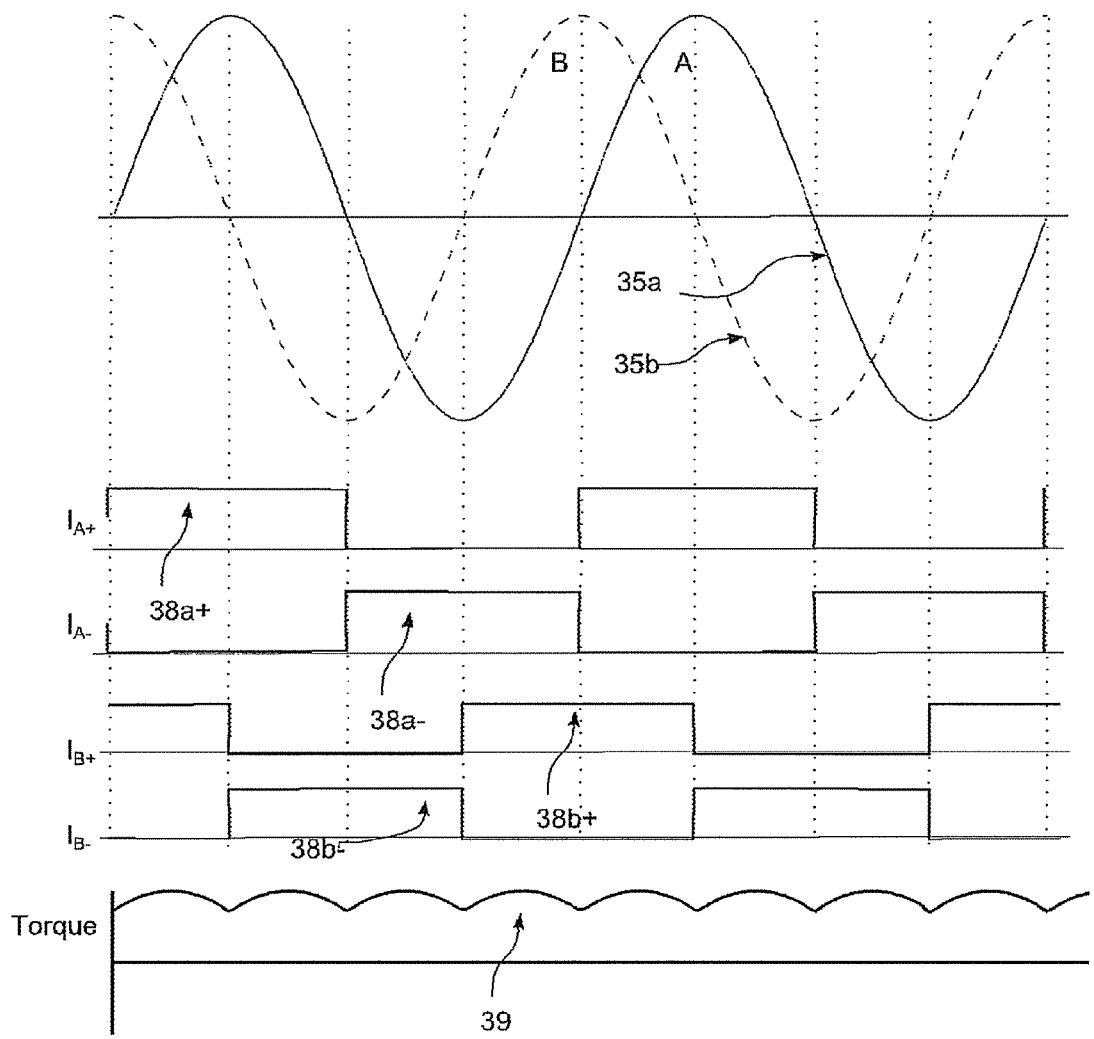
FIG. 10 shows the waveforms of the torque and of the currents in a third operating mode referred to as "two-phase, two-pole with a midpoint"
Figure 11:
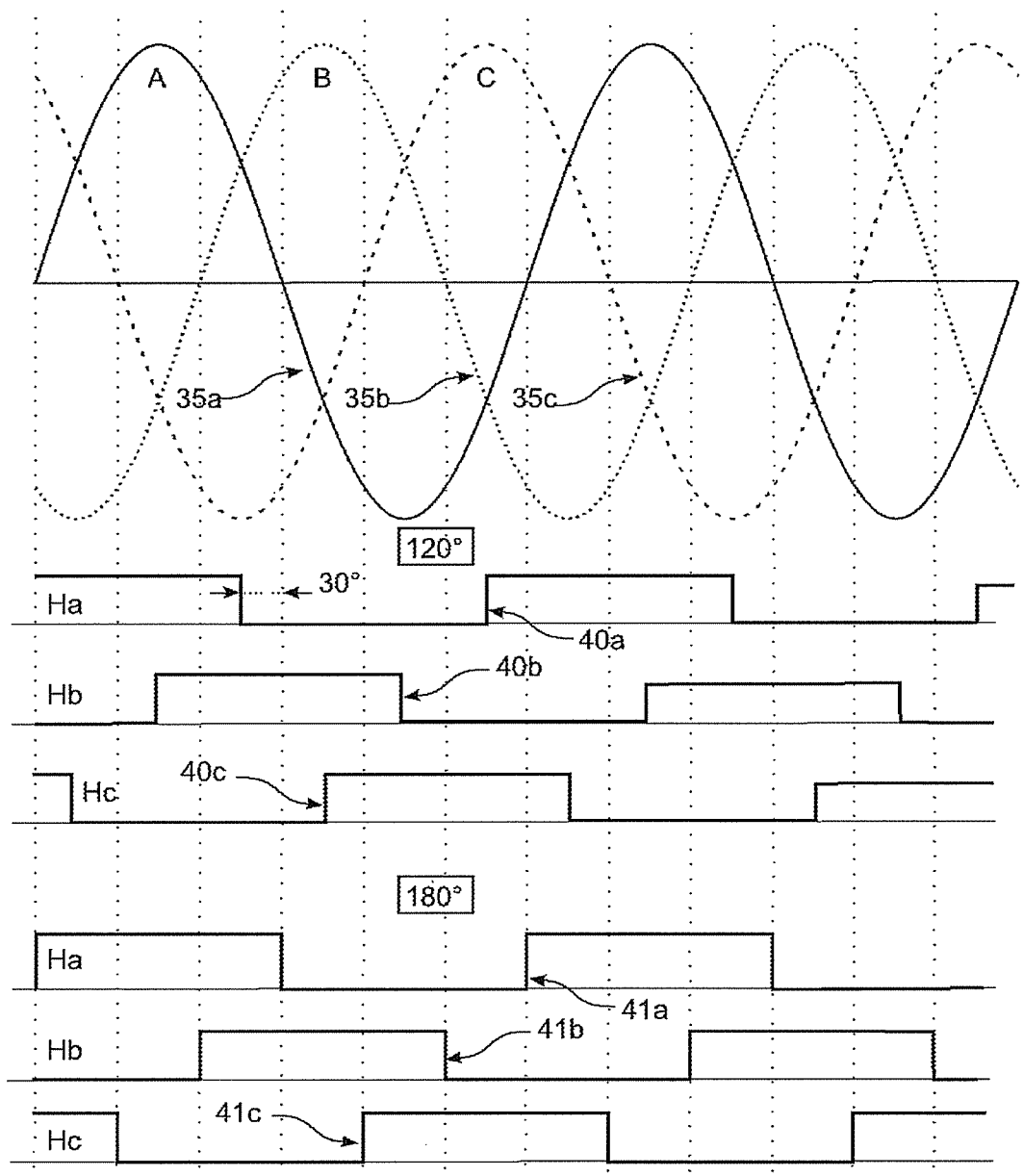
FIG. 11 shows the setting of the probes in the context of the two modes illustrated by FIGS. 8 and 9.

For each of these modes, the waveform of the currents flowing in the phases of the motor is shown in FIG. 8 and FIG. 9 respectively for the 120° mode and for the 180°. The moment of commutation of the probes differs depending on the operating mode, 120° or 180°. As shown in FIG. 11, the setting is advanced by 30° in the 120° mode in order to make it possible, by means of the simplified electronics described in FIG. 11, to obtain a current in phase with the back electromotive force (back-emf) (35a, 35b, 35c) guaranteeing maximum mean torque.

FIG. 8 shows the waveforms of the currents (36a, 36b, 36c) for each of the phases of the motor (8) and their respective phase relative to the back-emf (35a, 35b, 35c) of said phases of the motor (8). This mode of control is referred to as: 120° single-pole mode. The curve (37) shows the waveform of the drive torque of the motor.

FIG. 9 shows the waveforms of the currents (38a, 38b, 38c) for each of the phases of the motor (8) and their respective phase relative to the back-emf (35a, 35b, 35c) of said phases of the motor (8). This mode of control is referred to as: 180° single-pole mode. The curve (39) shows the waveform of the drive torque of the motor (8).

FIG. 11 gives the indications making it possible to select the best setting of the probes (11) relative to the references that are constituted by the back-emf signals (35a, 35b, 35c) generated by the phases of the motor (8). In particular, FIG. 11 shows the phasing of the signals (40a, 40b, 40c) of the probes Ha, Hb, Hc relative to the back-emf (35a, 35b, 35c) of the respective coils for a self-commutation mode at 120° and the phasing of the signals (41a, 41b, 41c) of the probes Ha, Hb, He relative to the back-emf (35a, 35b, 35c) of the respective coils for a self-commutation mode at 180° C.

Figure 15:
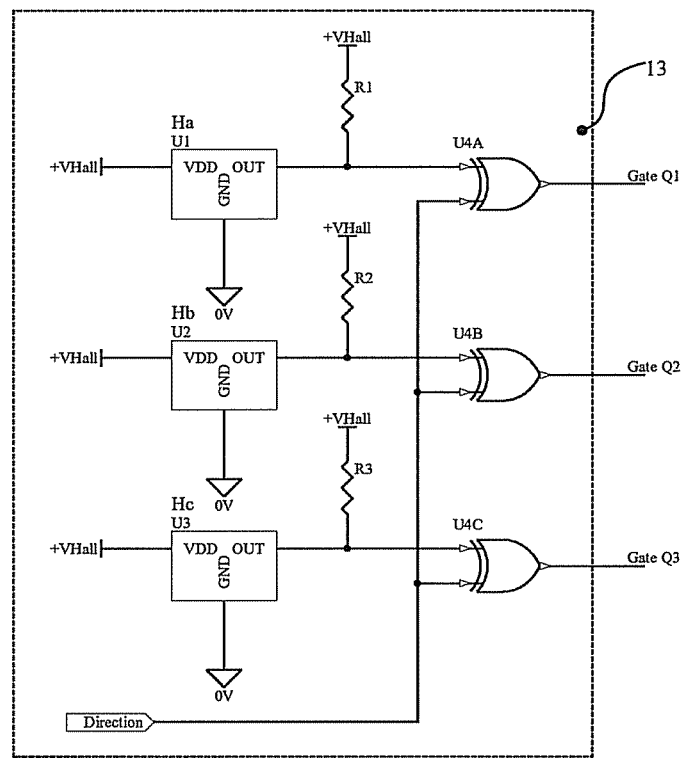
FIG. 15 shows a portion of the electronic circuit of the commutation logic (applying to the diagrams illustrated by FIGS. 12, 13, and 14) in a particular embodiment enabling the motor to be controlled in both directions, and its truth table.

It is known to persons skilled in the art that the direction of rotation of the motor can be reversed firstly by crossing the connections of the each of the coils of the phases of the motor, or secondly by reversing the signal at the outlet of each of the probes (11). This second possibility is the chosen solution, implemented by inserting an "EXCLUSIVE OR" function (U4a, U4b, U4c) at the outlets of the probes as shown in FIG. 15 so as to form a two-directional control (13). A direction signal common to each of the "EXCLUSIVE OR" gates (U4a, U4b, U4c) reverses or does not reverse the signal coming from the probe (11) and, in this manner, defines the direction of rotation of the motor (8). This option (13) is compatible with two-directional control in the 120° mode or in the 180° mode.

Figure 16:
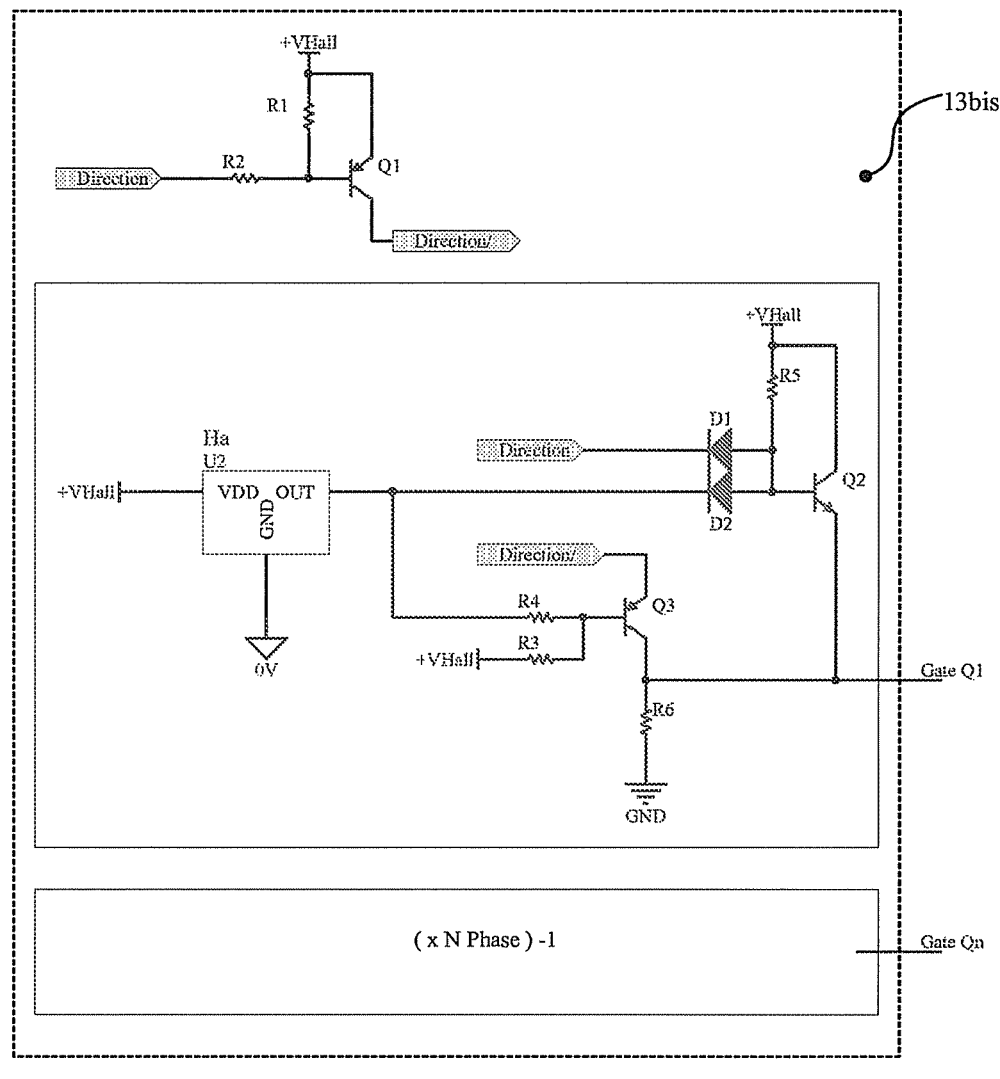
FIG. 16 shows a portion of the electronic circuit of the commutation logic (applying to the diagrams illustrated by FIGS. 12, 13, and 14) in a particular embodiment enabling the motor to be controlled in both directions, and its truth table, and as an alternative to the solution proposed in FIG. 15.

Another implementation (13 bis) shown in FIG. 16 makes it possible to achieve the same "EXCLUSIVE OR" function, and to do so with discrete components only (diodes, resistors, and transistors), thereby offering, more readily, very good compatibility with high-temperature environments. The truth table corresponds to GATE=NOT (DIRECTION+HN). This implementation may be preferred in applications requiring compatibility with high temperatures >125° $C_{.ambient}$.

Figure 4:
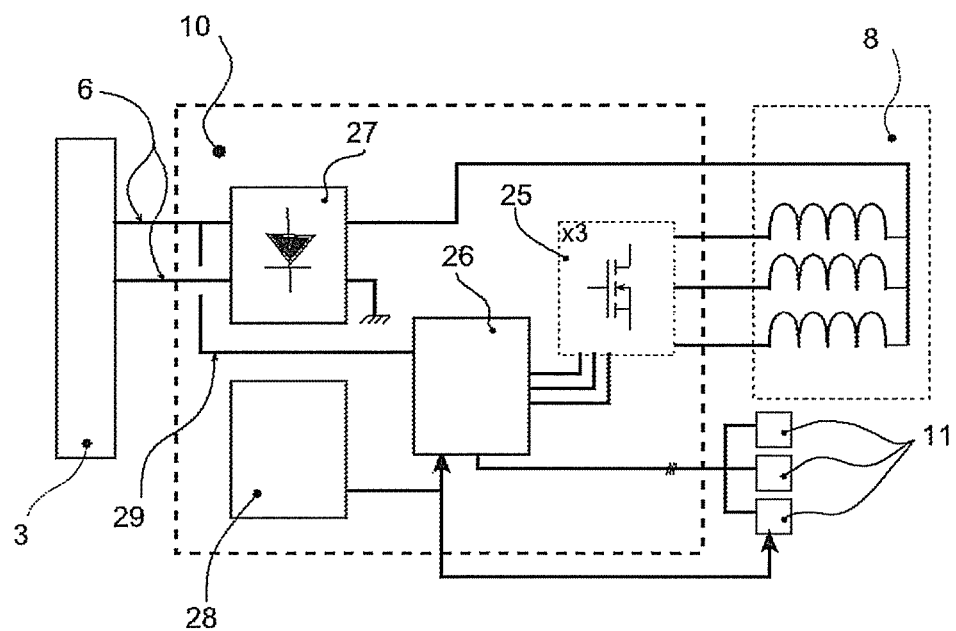
FIG. 4 shows, in detail, the rudimentary electronic circuit in the context of an actuator controlled in two-directional manner.
Figure 24:
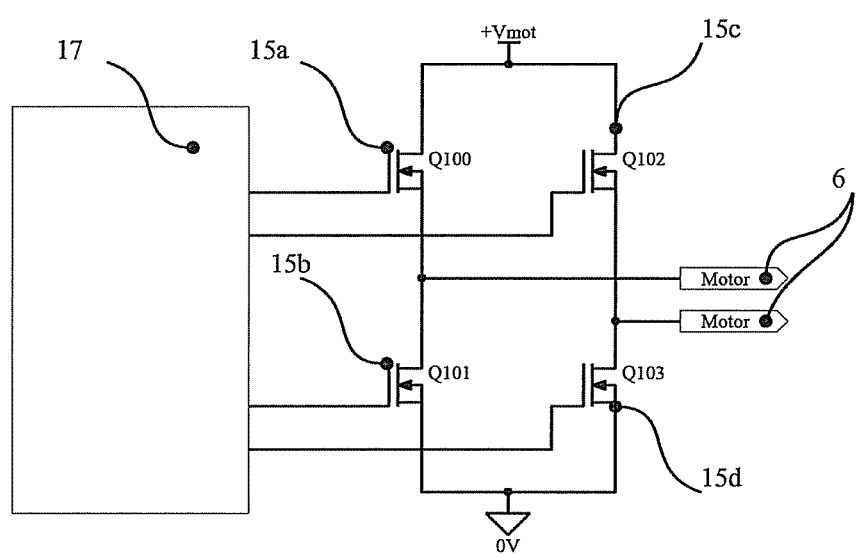
FIG. 24 shows the typical configuration of the power bridge of a control unit.

The outlet stage of an ECU (1) controlling an actuator is typically a circuit (FIG. 24) having four transistors (15a, 15b, 15c, 15d) forming a power "H-bridge" capable of delivering as output (6) current of positive or negative sign defining the direction of rotation of the motor, and of variable amplitude controlled by chopping the (PWM) signal applied to the transistors (15a, 15b, 15c, 15d). Since the rudimentary electronic circuit does not accept a power supply of reversed polarity, the use of a diode rectifier bridge (27) makes it possible to separate the combined torque+direction signals (6) delivered by the ECU (1) as shown in FIG. 4.

The combined direction+torque signal (6) present on the connector (3) powers the motor (8) after rectification by a diode rectifier bridge (27). The N probes (11) inform the commutation logic (26) of the N power transistors (25) commuting the currents in the N phases of the motor (8). The signal (29) taken upstream of the rectifier bridge (27) indicates the direction of rotation to the commutation logic (26). A voltage regulator (28) delivers the necessary power supply to the probes (11) and to the commutation logic (26).

Figure 19:
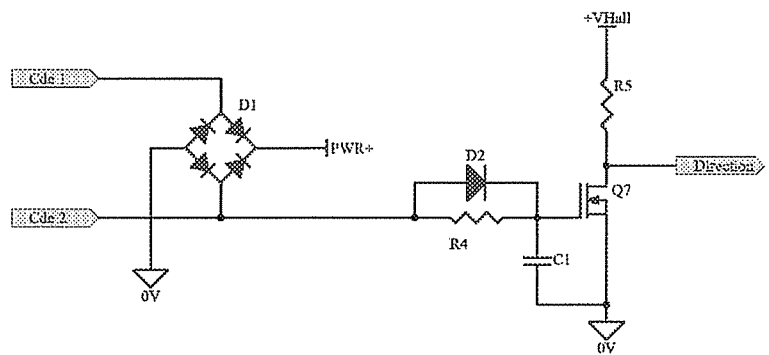
FIG. 19 shows a circuit making it possible to extract the direction information contained in the control signal.
Figure 20:
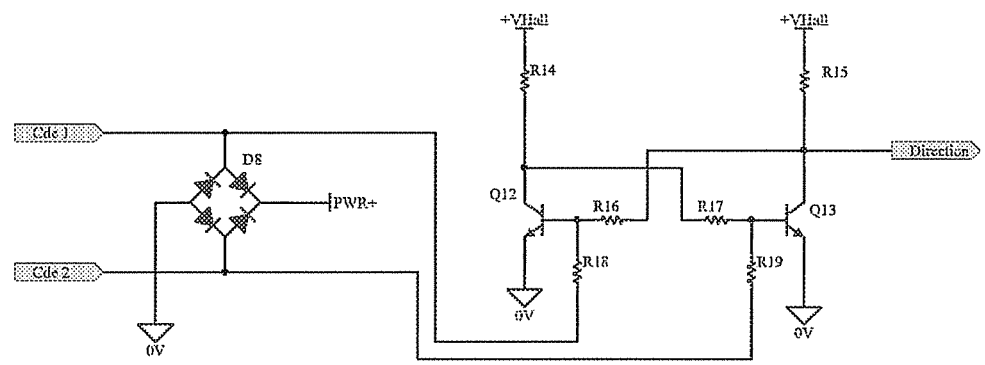
FIG. 20 shows a circuit making it possible to extract the direction information contained in the control signal.
Figure 21:
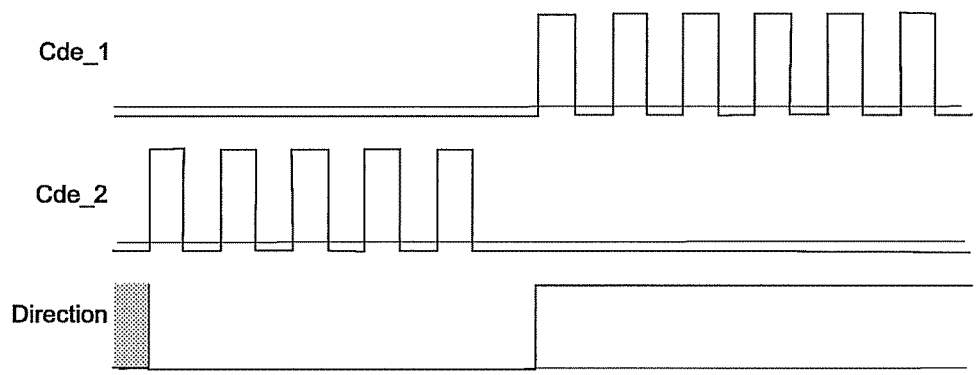
FIG. 21 shows the signals coming from the circuits shown in FIGS. 19 and 20.
Figure 22:
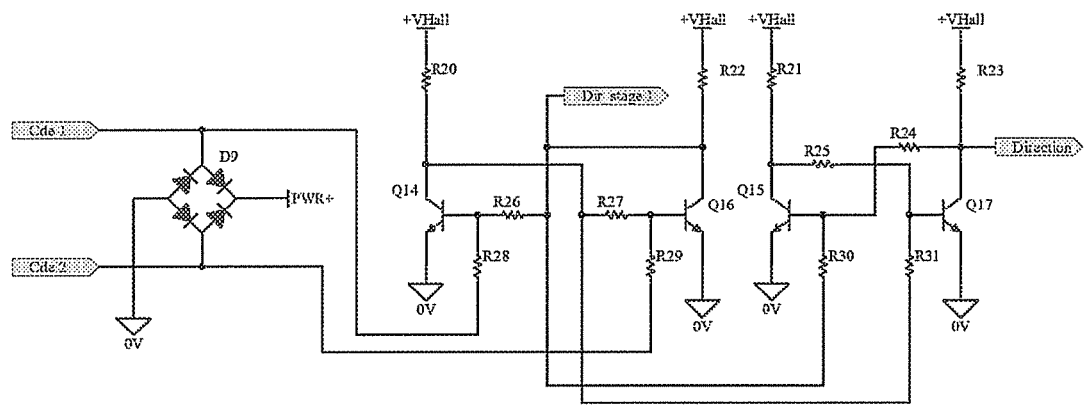
FIG. 22 shows a circuit making it possible to extract the direction information contained in the control signal.
Figure 23:
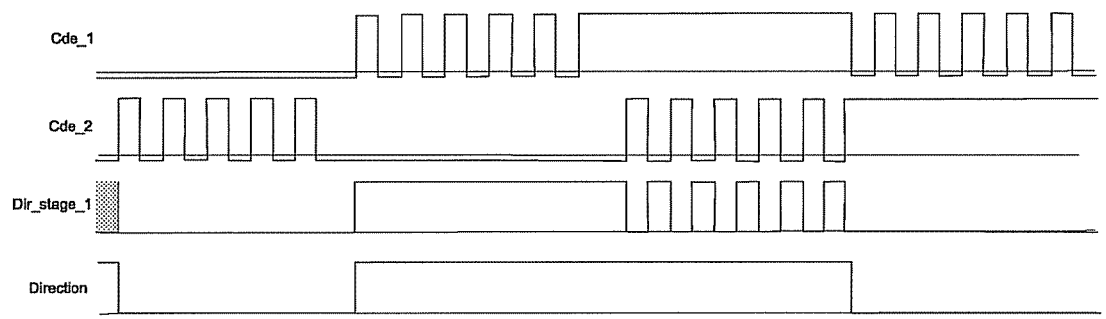
FIG. 23 shows the signals coming from the circuits shown in FIG. 22.

The signal (29) is taken upstream of the rectifier bridge (27) so as to extract therefrom the direction signal applied to the "EXCLUSIVE OR" gates (U4a, U4b, U4c). Since this direction signal is affected by the PWM command generated by the ECU (1) and modulates the current in the motor (8) to control the torque thereof, it is important to shape it by means of a conditioner shown in FIG. 19, which shows an example of a circuit making it possible to extract the direction information contained in the torque+direction control signal (6). FIG. 20 shows the electronic diagram for a different implementation offering the advantage of adapting automatically to the frequency of the PWM control signal generated by the ECU (1). The torque+direction control signal (6) is applied to the inlets of an SR latch or flip-flop, made up of transistors Q12 and Q13, and producing the direction signal as shown in FIG. 21. An extended electronic circuit implementing two cascaded SR latches shown in FIG. 22 makes it possible to extract a direction signal from the two-wire signal (6) regardless of the control mode: chopping on the "LOW SIDE" transistors or chopping on the "HIGH SIDE" transistors (mode depending on the control algorithm of the ECU (1)). The signals produced by these latches are shown in FIG. 23.

Figure 5:
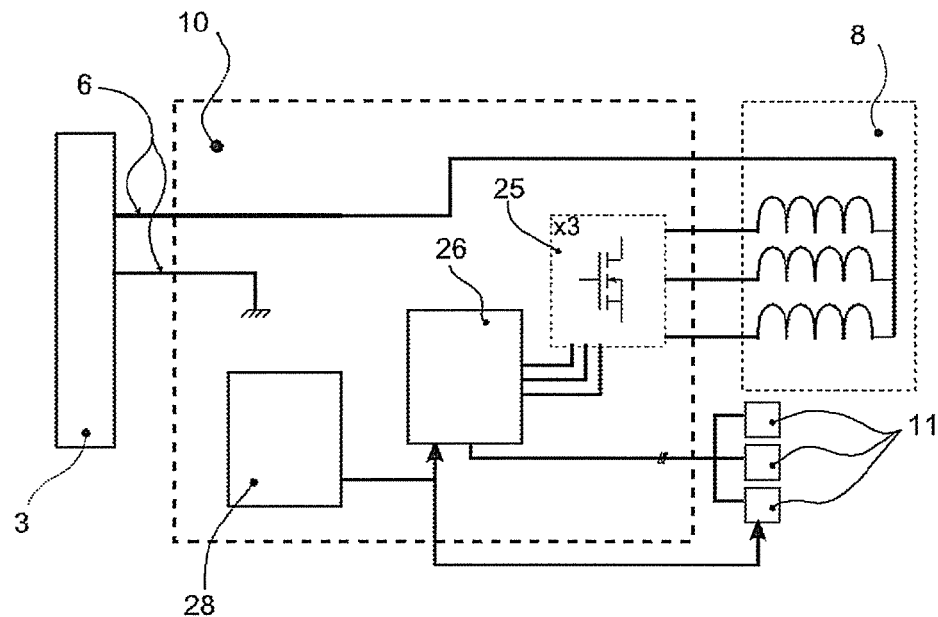
FIG. 5 shows, in detail, the rudimentary electronic circuit in the context of an actuator controlled in one-directional manner.

For applications in which the two-directional function of the actuator (2) is provided by an external element, e.g.: a return spring at the outlet of the actuator, it is possible to simplify the electronic circuit diagram and to comply with the one proposed in FIG. 5. The signal (6) then delivered by the ECU (1) then contains the torque information only. Since the polarity of the signal is fixed, the rectifier bridge (27) is no longer essential, and nor is the circuit for extracting the direction signal (FIG. 19) or the "EXCLUSIVE OR" functions (U4a, U4b, U4c).

When the motor (8) is not powered, a mechanical return mechanism urges the mechanical outlet (12) of the actuator (2) back into the rest position. The torque signal (6) present on the connector (3) powers the motor (8). The N probes (11) inform the commutation logic (26) of the N power transistors (25) commuting the currents in the N phases of the motor (8). A voltage regulator (28) delivers the necessary power supply to the probes (11) and to the commutation logic (26).

Figure 6:
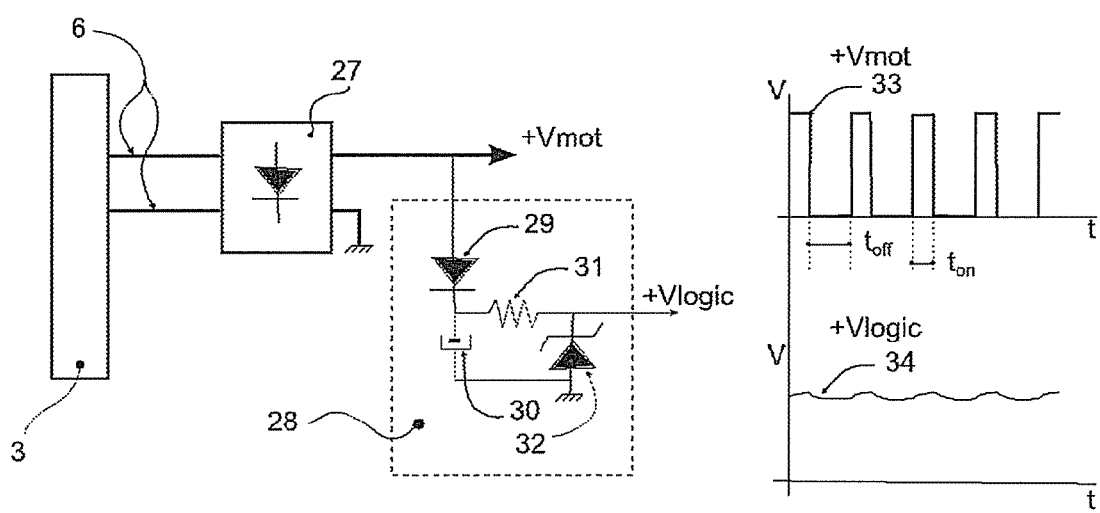
FIG. 6 shows the power supply of the commutation logic in a first embodiment.

In order to preserve compatibility with existing actuator systems, the power supply source (28) of the probes (11) and of the rudimentary electronic circuit (10) should be extracted from the available signals via the connector (3). A first proposal is to take the source at the torque signal delivered by the ECU, as shown in FIG. 6. The regulator circuit (28) makes it possible to obtain a continuous signal (34) of appropriate amplitude from a chopped signal (33). Here, the voltage regulator (28) is powered by the control signal (6). The diode (29)/capacitor (30) circuit makes it possible to store the energy transmitted by the PWM control signal (33) during the time $T_{on}$. The resistor (31)/Zener diode (32) circuit limits the voltage to a value acceptable by the components of the self-commutation electronics (26). The ECU (1) must nevertheless deliver a minimum torque signal so that the capacitor (30) can be recharged during the period $T_{on}$. The diode (29) prevents the capacitor (30) from discharging into the phases of the motor (8).

Figure 7:
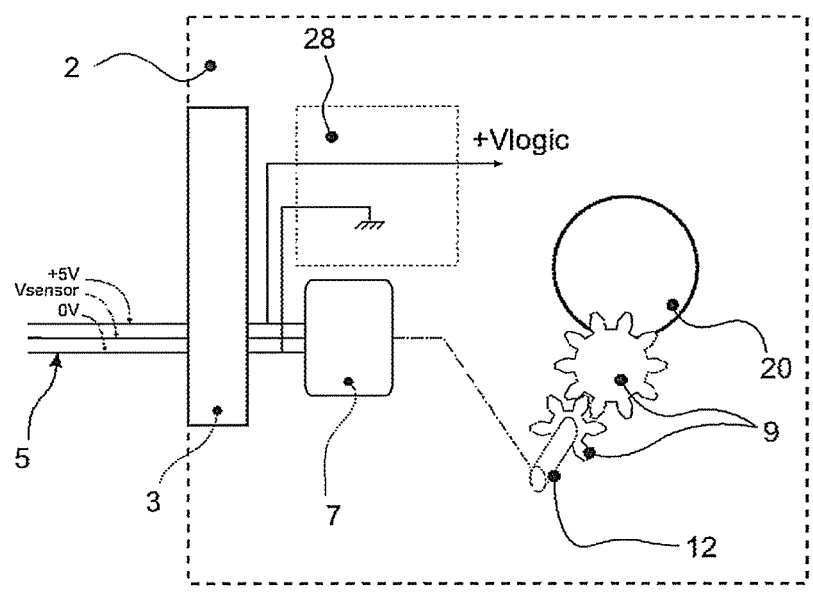
FIG. 7 shows the power supply of the commutation logic in a second embodiment.

A second proposal is, as shown in FIG. 7, to power the probes (11) and the rudimentary electronic circuit (10) with a power supply source common to the position sensor (7). The position sensor (7) coupled to the mechanical outlet (12) of the actuator (2) is powered by external signals (5) delivered generally, but not necessarily, by a 5V voltage source. The same voltage source is used by the regulator (28) for powering the self-commutation electronics (26).

Since the components implemented in this solution remain very basic, it is possible to choose them from a catalogue proposing operating temperatures greater than 125° C. The proposal shown in FIG. 7 is preferred in situations requiring operating temperatures much higher than 125° C. Since the capacitor (C30) used in the preceding embodiments is of the electrochemical type in view of the required values, that type of technology currently remains a difficult or indeed prohibitive issue for high-temperature applications.

The invention presented above on the basis of an example of a three-phase motor may equally well be applied to a polyphase motor having from 1 to N coils.

Figure 14:
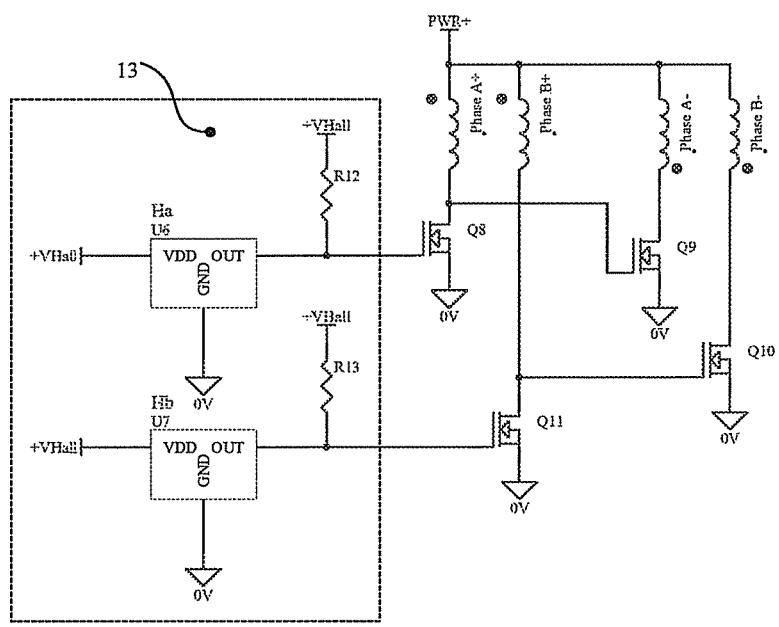
FIG. 14 shows the electronic circuit of the commutation logic in the "two-phase, two-pole with a midpoint" third mode, and its truth table.

A particular implementation is shown in FIG. 14, involving a two-phase brushless DC motor having four half-coils (N=2). Two probes (Ha and Hb) directly control the states of the N phases A and B by means of four power switches (Q8, Q9, Q10, and QII). The detection unit (13) may also integrate the "EXCLUSIVE OR" function as shown in FIG. 15 and FIG. 16 for the applications requiring two-directional control of the brushless DC motor.

It is known to persons skilled in the art that switching of a power switch in series with an inductive load, such as the coil of a phase of a motor, generates overvoltage as defined in the following formula: $E=-Ld(i)/d(t)$. In conventional circuit diagrams with three-phase motors (e.g.: FIG. 12 and FIG. 13), the characteristic $V_{(BR)DSS}$ (Drain-to-Source Breakdown Voltage) of the metal-oxide-semiconductor field-effect transistor (MOSFET) is highly stressed during the phases of demagnetization of the coil. The transistor must therefore be dimensioned accordingly.

Figure 17:
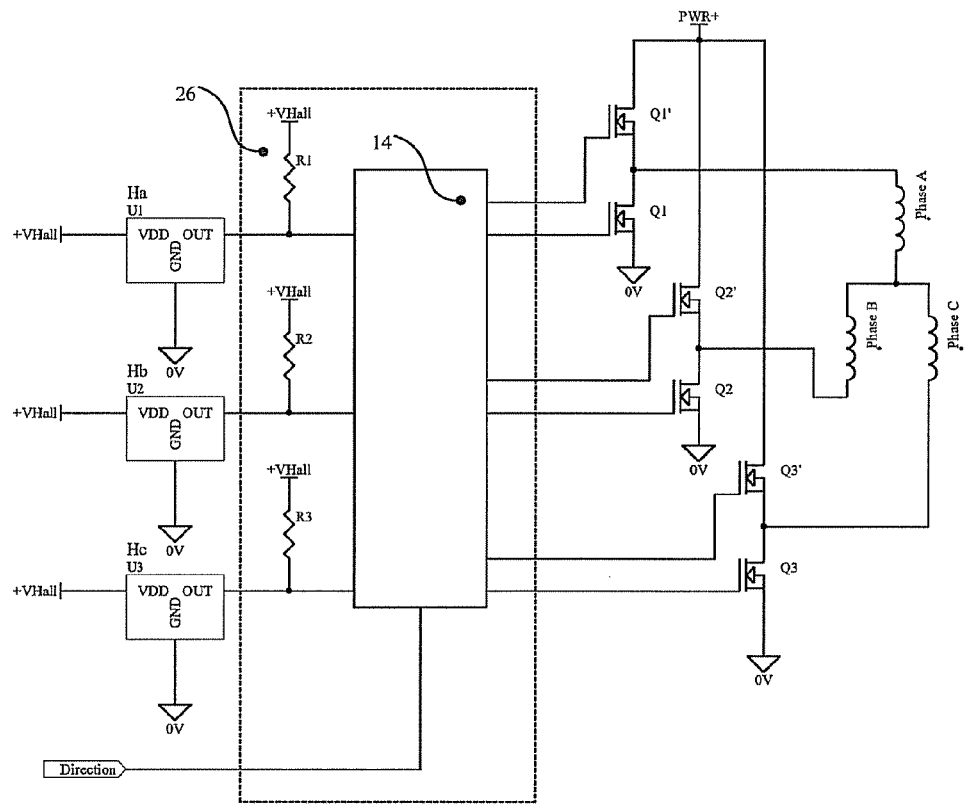
FIG. 17 shows a portion of the electronic circuit of the commutation logic in a particular embodiment enabling the motor to be controlled in both directions and in two-pole manner, and its truth table.

In the particular implementation using a "two-phase with a midpoint" brushless DC motor (FIG. 14), it is advantageous to prefer "bifilar" or "two wires in hand" winding in order to take advantage of very good coupling between the half-coils of each phase. Since considerable Phase A+/Phase A− and Phase B+/Phase B− mutual inductance is thus obtained, the magnetic flux switches from the "Phase A+" coil to the "Phase A−" coil when the power switch Q8 is opened (Q9 being controlled in complementary manner). From this coupling, the overvoltage at the terminals of the power switch is limited to twice the power voltage (PWR+). This also applies for the other motor phase: PhaseB+/PhaseB−, Q10, QII. The invention presented above on the basis of self-commutation electronics (26) effecting single-pole control (the current flows in a single direction of the winding only) of the brushless DC motor (8), remains applicable to a particular embodiment offering two-pole control (the current flows in both directions of the winding). FIG. 17 shows a circuit diagram for this particular embodiment; the control logic (14) for the six power transistors (QI, QI', Q2, Q2', Q3, Q3') complies with the truth table shown in the same figure.

This implementation is reserved for applications requiring better efficiency and/or better compactness of the motor. However, the rudimentary electronic circuit (10) is made up of six power transistors (three more), and its associated control logic (14) is more complex than the basic circuit diagrams of FIG. 12 and of FIG. 13. Another particular embodiment offering the same advantages, with a compromise on optimization of the motor, is shown in FIG. 18 with its truth table. The difference lies in the use of half-coils.

The invention claimed is:

1. A mechatronic assembly for positioning a member, the mechatronic assembly comprising a control unit and an actuator, the control unit comprising a servo-control algorithm and a power bridge, the algorithm controlling the power bridge, the power bridge delivering a two-wire electrical signal made up of a torque signal and of a direction signal, the actuator comprising a polyphase brushless electric motor having N phases, binary detection probes for detecting the position of the rotor of the motor, power switches suitable for powering the N phases of the motor from the two-wire electrical signal, and states of the power switches being controlled directly by a signal coming from the detection probes.

2. The mechatronic assembly for positioning the member according to claim 1, wherein the polyphase motor having N phases is constituted by N single-pole or two-pole coils, or by N×2 single-pole half-coils.

3. The mechatronic assembly for positioning the member according to claim 1, wherein a direction of rotation of the motor is imposed by an elementary combinatory logic built on the basis of polarity of the two-wire electrical signal and of the signal from the detection probes.

4. The mechatronic assembly for positioning the member according to claim 1, further comprising a servo-control sensor for absolute servo-control of the member, which sensor is powered by a second electrical signal.

5. The mechatronic assembly for positioning the member according to claim 1, further comprising a servo-control sensor for absolute servo-control of the member, which sensor is powered by the two-wire electrical signal.

6. The mechatronic assembly for positioning the member according to claim 1, wherein the binary detection probes for detecting the position of the rotor are powered by the two-wire electrical signal.

7. The mechatronic assembly for positioning the member according to claim 4, wherein the binary detection probes for detecting the position of the rotor are powered by the second electrical signal.

8. The mechatronic assembly for positioning the member according to claim 1, wherein the two-wire electrical signal is a continuous signal of amplitude and of sign controlled by the servo-control algorithm on the basis of the position information given by the servo-control sensor.

9. The mechatronic assembly for positioning the member according to claim 1, wherein the two-wire electrical signal is a chopped signal of mark-to-space ratio or duty cycle controlled by the servo-control algorithm on the basis of the position information given by the servo-control sensor.

10. The mechatronic assembly for positioning the member according to claim 1, wherein the two-wire signal is rectified by a diode bridge in order to feed positive current to the N phases of the motor.

11. The mechatronic assembly for positioning the member according to claim 3, wherein the direction of rotation of the motor is determined by a direction signal extracted from the two-wire signal one or two latches or flip-flops, making it independent of a frequency and of a mark-to-space ratio or duty cycle of chopping of the two-wire signal.

12. The mechatronic assembly for positioning the member according to claim 1, wherein the motor further comprises half-coils having high magnetic coupling, limiting dissipation in the power switches during the phases of demagnetization of the coil.

13. A fluid flow control valve comprising a valve member driven by an actuator of a mechatronic assembly equipped with a control unit comprising a servo-control algorithm and a power bridge, the algorithm controlling the power bridge, the power bridge delivering a two-wire electrical signal made up of a torque signal and of a direction signal, the actuator comprising a polyphase brushless electric motor having N phases, binary detection probes for detecting the position of the rotor of the motor, power switches suitable for powering the N phases of the motor from the two-wire electrical signal, and states of the power switches being controlled directly by a signal coming from the detection probes.

14. A servo-control circuit for servo-controlling an actuator of a moving member mounted on an internal combustion engine, the servo-control circuit comprising a computer executing a servo-control algorithm and a power bridge, the algorithm controlling the power bridge, the power bridge delivering a two-wire electrical signal comprising a torque signal and of a direction signal, the actuator comprising a polyphase brushless electric motor having N phases, binary detection probes for detecting the position of the rotor of the motor, power switches suitable for powering the N phases of the motor from the two-wire electrical signal, and states of the power switches being controlled directly by a signal coming from the detection probes.

15. The servo-control circuit according to claim 14, wherein the actuator is a dumb actuator with the computer associated with the electric motor being remote from an automobile area reaching a temperature of more than 125° C. where the electric motor is located.

16. The servo-control circuit according to claim 14, further comprising a resistor, a transistor and a diode being electrically connected to and located adjacent to the electric motor in an automobile area reaching a temperature of more than 125° C. where the electric motor is located.

17. The mechatronic assembly according to claim 1, wherein the actuator is a dumb actuator with the control unit associated with the electric motor being remote from an automobile area reaching a temperature of more than 125° C. where the electric motor is located.

18. The mechatronic assembly according to claim 1, further comprising a resistor, a transistor and a diode being electrically connected to and located adjacent to the electric motor in an automobile area reaching a temperature of more than 125° C. where the electric motor is located.

19. The fluid control valve of claim 13, wherein the actuator is a dumb actuator with the control unit associated with the electric motor is remote from an automobile area reaching a temperature of more than 125° C. where the electric motor is located.

20. The fluid control valve of claim 13, wherein a resistor, a transistor and a diode being electrically connected to and located adjacent to the electric motor in an automobile area reaching a temperature of more than 125° C. where the electric motor is located.

* * * * *